US010600389B2

United States Patent
Chen et al.

(10) Patent No.: US 10,600,389 B2
(45) Date of Patent: Mar. 24, 2020

(54) DISPLAY DRIVING APPARATUS AND DISPLAY DRIVING METHOD THEREOF

(71) Applicant: Novatek Microelectronics Corp., Hsinchu (TW)

(72) Inventors: Chien-Yu Chen, Hsinchu County (TW); Chien-Chou Hung, Hsinchu (TW); Wei-Ying Tu, Hsinchu (TW); Jiun-Ting Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/814,375

(22) Filed: Nov. 15, 2017

(65) Prior Publication Data

US 2018/0075819 A1    Mar. 15, 2018

Related U.S. Application Data

(60) Continuation of application No. 15/175,047, filed on Jun. 7, 2016, now Pat. No. 9,858,898, which is a (Continued)

(30) Foreign Application Priority Data

Jan. 24, 2013 (TW) ............................. 102102688 A

(51) Int. Cl.
*G09G 5/18* (2006.01)
*G06F 1/3234* (2019.01)
(Continued)

(52) U.S. Cl.
CPC ............. *G09G 5/18* (2013.01); *G06F 1/3218* (2013.01); *G06F 1/3265* (2013.01); *G09G 5/12* (2013.01);
(Continued)

(58) Field of Classification Search
CPC ... G09G 2310/0213; G09G 2310/0214; G09G 2310/0227; G09G 2310/065;
(Continued)

(56) References Cited

U.S. PATENT DOCUMENTS 6,211,854 B1 * 4/2001 Fujiyoshi ............. G09G 3/2092
345/10
8,963,936 B1 * 2/2015 Khoury .................... G09G 5/36
345/531
(Continued)

*Primary Examiner* — David Tung
(74) *Attorney, Agent, or Firm* — JCIPRNET

(57) ABSTRACT

A display driving apparatus including a receiver circuit, a detection circuit and a driving circuit is provided. The receiver circuit receives the video image data at a first rate. The detection circuit is coupled to the receiver circuit. The detection circuit detects whether the video image data is a static image, and determines whether the display driving apparatus enters a power saving mode based on a detecting result. The driving circuit is coupled to the receiver circuit. The driving circuit drives the display panel. In the power saving mode, the receiver circuit continuously receives the video image data at the first rate, and periodically masks a part of the video image data according to the detecting result and outputs an unmasked part of the video image data to the driving circuit. Furthermore, a display driving method adapted for the foregoing display driving apparatus is also provided.

16 Claims, 4 Drawing Sheets

Related U.S. Application Data division of application No. 13/943,803, filed on Jul. 17, 2013.

(51) Int. Cl.
*G06F 1/3218* (2019.01)
*G09G 5/12* (2006.01)

(52) U.S. Cl.
CPC . *G09G 2310/065* (2013.01); *G09G 2310/067* (2013.01); *G09G 2320/103* (2013.01); *G09G 2330/021* (2013.01); *G09G 2370/08* (2013.01); *Y02D 10/153* (2018.01); *Y02D 50/20* (2018.01)

(58) Field of Classification Search
CPC ......... G09G 2310/067; G09G 2330/02; G09G 2330/021; G09G 2330/022; G09G 5/18; G09G 5/12
See application file for complete search history.

(56) References Cited

U.S. PATENT DOCUMENTS

| | | | | |
|---|---|---|---|---|
| 2005/0110783 A1* | 5/2005 | Sklovsky | ................. | G09G 5/02 345/204 |
| 2012/0146968 A1* | 6/2012 | Glen | ...................... | G09G 5/003 345/204 |
| 2013/0106876 A1* | 5/2013 | Lee | ........................ | G06F 13/14 345/520 |

* cited by examiner

US 10,600,389 B2

DISPLAY DRIVING APPARATUS AND DISPLAY DRIVING METHOD THEREOF

CROSS-REFERENCE TO RELATED APPLICATION

This is a continuation application of and claims the priority benefit of U.S. application Ser. No. 15/175,047, filed on Jun. 7, 2016, now allowed. The prior U.S. application Ser. No. 15/175,047 is a divisional application of and claims the priority benefit of U.S. application Ser. No. 13/943,803, filed on Jul. 17, 2013, which claims the priority benefit of Taiwan application serial no. 102102688, filed on Jan. 24, 2013. The entirety of each of the above-mentioned patent applications is hereby incorporated by reference herein and made a part of this specification.

BACKGROUND

Technical Field

The invention relates to a driving apparatus and a driving method. Particularly, the invention relates to a display driving apparatus and a display driving method thereof.

Related Art

Generally, display driving apparatuses are grouped into display driving apparatuses containing RAM and RAM-less display driving apparatuses according to whether the display driving apparatus has an inbuilt memory. The inbuilt memory is generally used to temporarily store video image data provided by a host, and wait for instruction of a clock signal to output the stored video image data to a next-stage circuit.

Regarding the RAM-less display driving apparatus, since the inbuilt memory such as a frame buffer, etc. is not configured in internal of the display driving apparatus, the host has to continuously transmit the video image data and vertical and horizontal synchronous signals to the display driving apparatus through a signal transmission interface, so as to facilitate a display panel normally displaying the video images. The signal transmission interface used to transmit signals can be a RGB mode interface or a mobile industry processor interface (MIPI).

Regardless of the type of the signal transmission interface used for transmitting data, current consumption of the display driving apparatus generally includes analog current consumption caused by panel loading and digital current consumption caused by digital signal action of the signal transmission interface. Regarding the RAM-less display driving apparatus, since the host has to continuously write data to the signal transmission interface, the digital current consumption has a great influence on the whole current consumption of the display driving apparatus, which is even higher than the analog current consumption in some applications. Therefore, it is an important issue to decrease the power consumption of the display driving apparatus caused by the digital current consumption.

SUMMARY

Accordingly, the invention is directed to a display driving apparatus, which is capable of providing a power saving function according to a display image, so as to decrease digital current consumption.

The invention provides a display driving method of the aforementioned display driving apparatus, by which a power saving function is provided according to a display image, so as to decrease digital current consumption.

The invention provides a display driving apparatus, which is used to drive a display panel according to video image data. The display driving apparatus includes a signal transmission interface, a timing control circuit and an image detection circuit. The signal transmission interface is configured to receive the video image data and output the video image data. The timing control circuit is coupled to the signal transmission interface, and is configured to receive the video image data and drive the display panel based on the video image data. The image detection circuit is coupled to the signal transmission interface and is configured to receive the video image data. The image detection circuit determines whether the video image data is a static image and determines whether the display driving apparatus enters a power saving mode based on a determination result. In the power saving mode, the signal transmission interface masks a part of the video image data according to the determination result, so as not to output the masked video image data to the timing control circuit.

In an embodiment of the invention, the video image data includes a plurality of batches of frame data. The signal transmission interface masks a part of the frame data in the video image data in the power saving mode.

In an embodiment of the invention, the signal transmission interface further outputs a vertical synchronous signal to the timing control circuit. In the power saving mode, the masked frame data is arranged at intervals in the frame data in a fixed timing length in response to the vertical synchronous signal.

In an embodiment of the invention, the video image data further includes a plurality of start signals. The start signals are located between the frame data for identifying the frame data.

In an embodiment of the invention, the signal transmission interface includes a receiver circuit. The receiver circuit is used to receive the video image data. In the power saving mode, the image detection circuit disables the receiver circuit according to the start signal.

In an embodiment of the invention, the display driving apparatus further includes a gate driving circuit. The gate driving circuit provides a scan signal to drive the display panel. In the power saving mode, the timing control circuit outputs a control signal in response to the masked frame data to disable the gate driving circuit.

In an embodiment of the invention, the video image data includes a plurality of batches of frame data, and each batch of the frame data includes a plurality of batches of line data. The signal transmission interface masks a part of the line data in the frame data in the power saving mode.

In an embodiment of the invention, the signal transmission interface further outputs a horizontal synchronous signal to the timing control circuit. In the power saving mode, the masked line data is arranged at intervals in each batch of the frame data in a fixed timing length in response to the horizontal synchronous signal.

In an embodiment of the invention, in a plurality of batches of first frame data of the frame data, the masked line data includes even-numbered line data in the line data. In a plurality of batches of second frame data of the frame data, the masked line data includes odd-numbered line data in the line data. The first frame data and the second frame data are sequentially arranged at intervals in timing.

In an embodiment of the invention, the video image data further includes a plurality of start signals. The start signals are located between the frame data for identifying the frame data.

In an embodiment of the invention, the display driving apparatus further includes a gate driving circuit. The gate driving circuit provides a scan signal to drive the display panel during a period that the part of line data is masked in the power saving mode.

The invention provides a display driving method, which is used to drive a display panel according to video image data. The display driving method includes following steps. The video image data is received. It is determined whether the video image data is a static image. It is determined whether the display driving apparatus enters a power saving mode based on a determination result. In the power saving mode, a part of the video image data is masked according to the determination result. The display panel is driven according to the video image data.

In an embodiment of the invention, the video image data includes a plurality of batches of frame data. The step of masking a part of the video image data includes masking a part of the frame data in the video image data.

In an embodiment of the invention, the display driving method further includes driving the display panel according to a vertical synchronous signal. In the power saving mode, the masked frame data is arranged at intervals in the frame data in a fixed timing length in response to the vertical synchronous signal.

In an embodiment of the invention, the video image data further includes a plurality of start signals. The start signals are located between the frame data for identifying the frame data.

In an embodiment of the invention, the video image data further includes receiving the video image data by using a receiver circuit. The video image data further includes disabling the receiver circuit according to the start signal in the power saving mode.

In an embodiment of the invention, the display driving method further includes following steps. A gate driving circuit is used to a scan signal to drive the display panel. In the power saving mode, a control signal is output in response to the masked frame data to disable the gate driving circuit.

In an embodiment of the invention, the video image data includes a plurality of batches of frame data, and each batch of the frame data includes a plurality of batches of line data. In the step of masking a part of the video image data, a part of the line data in the frame data is masked.

In an embodiment of the invention, the display driving method further includes driving the display panel according to a horizontal synchronous signal. In the power saving mode, the masked line data is arranged at intervals in each batch of the frame data in a fixed timing length in response to the horizontal synchronous signal.

In an embodiment of the invention, in a plurality of batches of first frame data of the frame data, the masked line data includes even-numbered line data in the line data. In a plurality of batches of second frame data of the frame data, the masked line data includes odd-numbered line data in the line data. The first frame data and the second frame data are arranged at intervals in timing.

In an embodiment of the invention, the video image data further includes a plurality of start signals. The start signals are located between the frame data for identifying the frame data.

In an embodiment of the invention, the display driving method further includes using a gate driving circuit to provide a scan signal to drive the display panel during a period that the part of line data is masked in the power saving mode.

According to the above descriptions, in the exemplary embodiment of the invention, the display driving apparatus has the power saving mode to decrease digital current consumption. In the power saving mode, the signal transmission interface masks a part of the video image data and does not output the masked video image data to the timing control circuit, so as to achieve a power saving effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
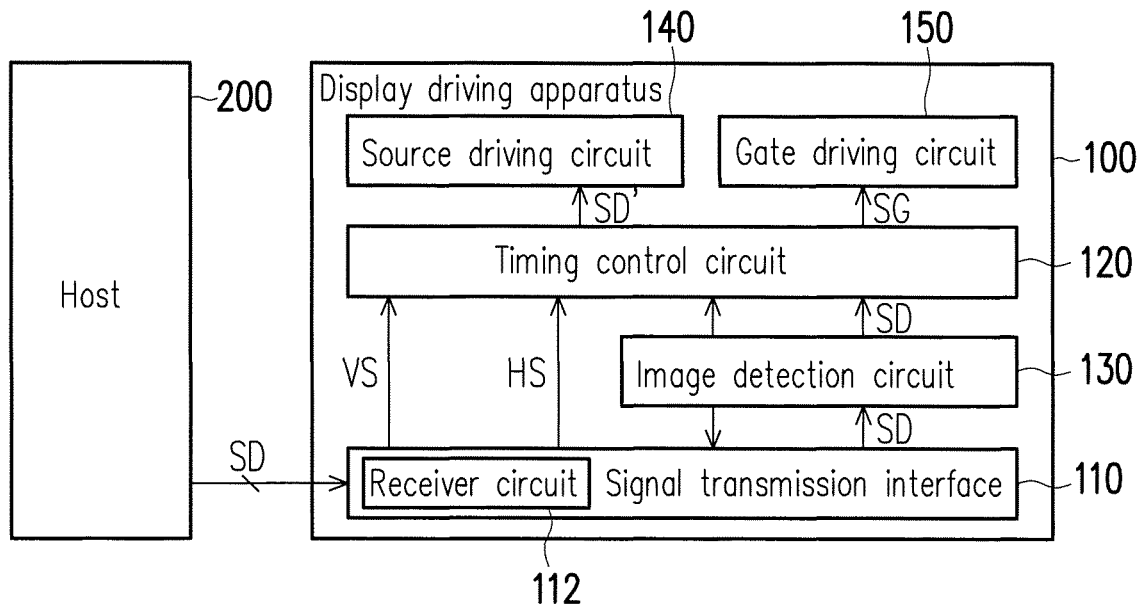
FIG. 1 is a schematic diagram of a display driving apparatus according to an embodiment of the invention.

FIG. 1 is a schematic diagram of a display driving apparatus according to an embodiment of the invention. Referring to FIG. 1, the display driving apparatus 100 of the present embodiment receives video image data SD from a host 200, and drives a display panel (not shown) according to the video image data SD. In the present embodiment, in order to achieve a power saving effect, the display driving apparatus 100 can modulate a display behavior including determining whether the video image data SD is a static image, so as to determine whether to enter a power saving mode without adjusting a design structure of the host 200.

In detail, the display driving apparatus 100 includes a signal transmission interface 110, a timing control circuit 120, an image detection circuit 130, a source driving circuit 140 and a gate driving circuit 150. In the present embodiment, the signal transmission interface 110 includes a receiver circuit 112, and receives the video image data SD, and outputs the video image data SD, a horizontal synchronous signal HS and a vertical synchronous signal VS to the control circuit 120 and the image detection circuit 130. The signal transmission interface 110 can be a RGB mode interface, a MIPI mode interface or other signal transmission interface, which is not limited by the invention. In the embodiment of the MIPI mode interface, the receiver circuit 112 is, for example, a DPHY circuit complied with the MIPI mode interface.

In the present embodiment, the timing control circuit 120 is coupled to the signal transmission interface 110, and receives the video image data SD, the horizontal synchronous signal HS and the vertical synchronous signal VS. Moreover, the timing control circuit 120 transmits the video image data SD, the horizontal synchronous signal HS and the vertical synchronous signal VS to the source driving circuit 140 and the gate driving circuit 150 to facilitate the source driving circuit 140 and the gate driving circuit 150 accordingly driving the display panel. It should be noticed that in order to achieve the power saving effect, in the power saving mode, a part of frame data or line data in the video image data SD transmitted to the source driving circuit 140 is probably masked by the timing control circuit 120, and the masked frame data or line data is not output to the source driving circuit 140 to decrease the digital current consumption.

In the present embodiment, the image detection circuit 130 is coupled between the signal transmission interface 110 and the timing control circuit 120, and receives the video image data SD. In the present embodiment, the image detection circuit 130 determines whether the video image data transmitted from the host 200 is a static image and determines whether the display driving apparatus 100 enters the power saving mode based on a determination result. The method for the image detection circuit 130 determining whether the display driving apparatus 100 enters the power saving mode is described below.

Figure 2:
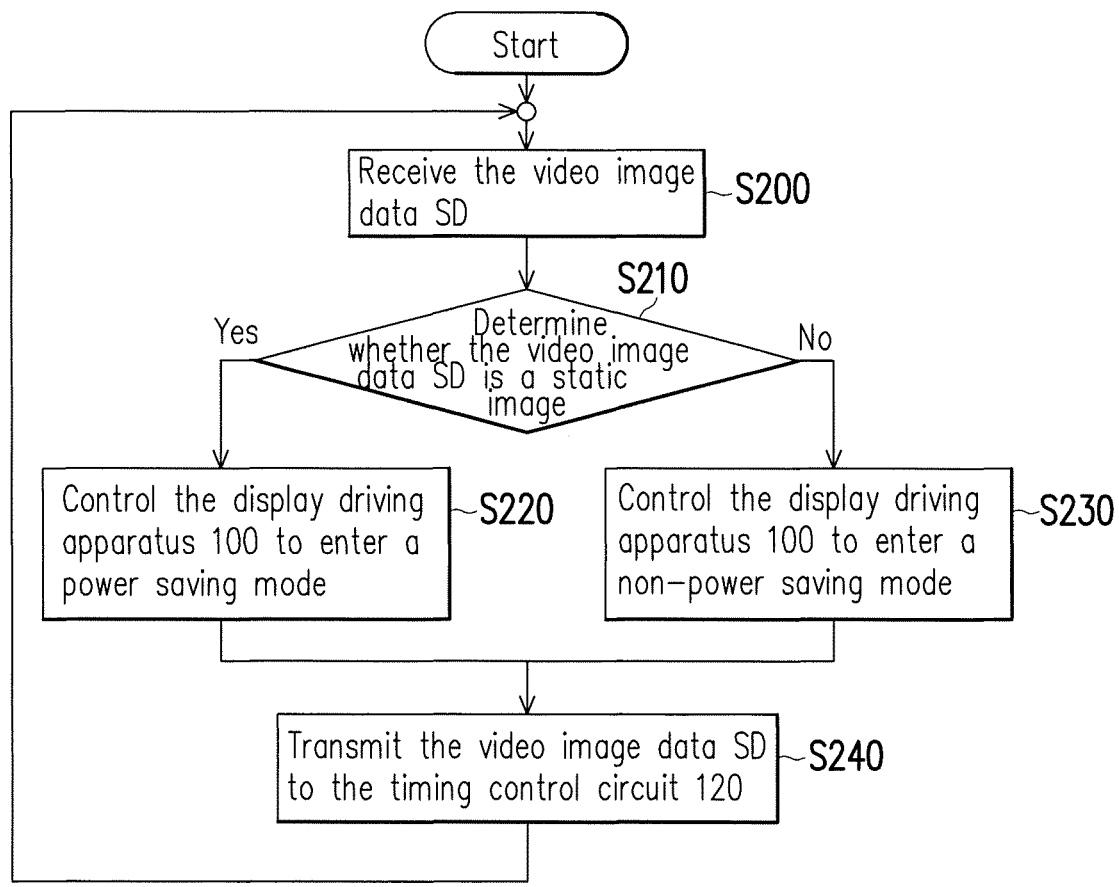
FIG. 2 is a flowchart illustrating a method for determining whether a power saving mode of a display driving apparatus is activated according to an embodiment of the invention.

FIG. 2 is a flowchart illustrating a method for determining whether the power saving mode of the display driving apparatus is activated according to an embodiment of the invention. Referring to FIG. 1 and FIG. 2, the method includes following steps. First, in step S200, the image detection circuit 130 receives the video image data SD output by the signal transmission interface 110. Then, in step S210, the image detection circuit 130 determines whether the video image data SD is a static image, and the determination method thereof includes comparing a difference between image content characteristics of two images according to the image content characteristic such as image resolution, image brightness, image spectrum distribution, image difference, image correlation, image number of colors, image refresh rate or display mode, etc. based on frame, so as to determine whether the current video image data SD is the static image.

Therefore, if it is determined in the step S210 that the received video image data SD is the static image, in step S220, the image detection circuit 130 controls the display driving apparatus 100 to enter the power saving mode. In the power saving mode, the signal transmission interface 110 masks a part of the video image data SD according to the determination result, so that the image detection circuit 130 does not output the masked video image data to the timing control circuit 120. On the other hand, if it is determined in the step S210 that the received video image data SD is a dynamic image, in step S230, the image detection circuit 130 controls the display driving apparatus 100 to enter a non-power saving mode. In the step S230, the non-power saving mode is, for example, a normal operation mode, and in such operation mode, the signal transmission interface 110 does not mask the video image data SD, but directly outputs the video image data SD to the timing control circuit 120 through the image detection circuit 130, so as to implement image display.

Then, in step S240, the signal transmission interface 110 transmits the video image data SD to the timing control circuit 120 through the image detection circuit 130. The video image data SD can be the video image data SD of the power saving mode with a part of data therein being masked, or can be the video image data SD of the non-power saving mode without data being masked.

In the exemplary embodiment of the invention, when the display driving apparatus 100 enters the power saving mode, the method of power saving operation at least includes masking a part of frame data in the video image data SD, masking a part of line data in the frame data, or directly disabling the receiver circuit 112 in the signal transmission interface 110. Implementations of the power saving operation are respectively described below.

Figure 3:
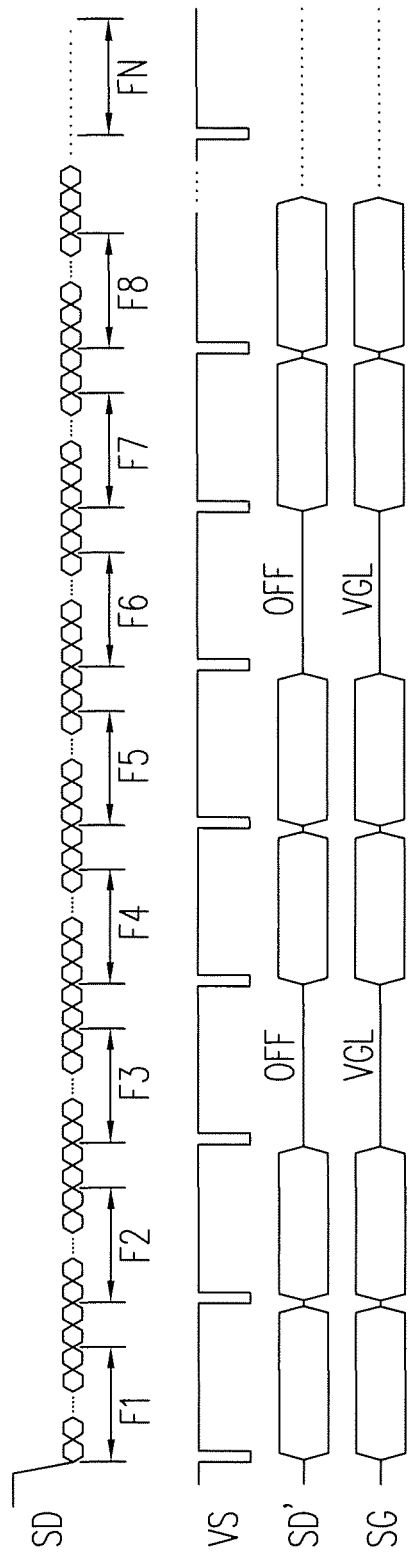
FIG. 3 is a waveform diagram of various signals of a display driving apparatus according to an embodiment of the invention.

FIG. 3 is a waveform diagram of various signals of a display driving apparatus according to an embodiment of the invention. Referring to FIG. 1 and FIG. 3, the signal waveforms of FIG. 3 are sequentially signal waveforms of the video image data SD, the vertical synchronous signal VS, video image data SD' output to the source driving circuit 140 and a gate control signal SG output to the gate driving circuit 150 from top to bottom.

In the present embodiment, taking the MIPI mode interface as an example, the video image data SD is, for example, transmitted to the signal transmission interface 110 through a DP/NP data lane, which has a characteristic of high speed data transfer. In such example, the video image data SD can be approximately divided into a plurality of batches of frame data F1-FN based on frame. In the power saving mode, after the signal transmission interface 110 receives the video image data SD, the signal transmission interface 110 masks a part of the frame data in the video image data SD. In the present embodiment, the signal transmission interface 110 masks the frame data F3 and F6, and then transmits the video image data SD to the timing control circuit 120. Therefore, in view of the video image data SD', the masked frame data F3 and F6 are arranged at intervals in the frame data F1-FN in a fixed timing length in response to the vertical synchronous signal VS, where the timing length, for example, refers to a timing length of two frame periods. Namely, after the signal transmission interface 110 sequentially outputs the frame data F1 and F2 to the timing control circuit 120, the signal transmission interface 110 does not output the frame data F3 to the timing control circuit 120, i.e. masks the frame data F3. Then, the signal transmission interface 110 sequentially outputs the frame data F4 and F5 to the timing control circuit 120, and does not output the frame data F6 to the timing control circuit 120, i.e. masks the frame data F6. In FIG. 3, the video image data SD' is indicated as "OFF" at places corresponding to the frame data F3 and F6, which represents that the frame data F3 and F6 are masked. Therefore, according to such frame data masking method, in such example, an operation frequency of the display panel can be decreased by ⅓ to achieve the power saving effect. It should be noticed that in the present embodiment, the number of batches and timing positions of the masked frame data in the video image data SD' can be determined according to an actual design requirement, which is not limited by the invention.

It should be noticed that in the power saving mode, in response to the masked frame data F3 and F6, the timing control circuit 120 outputs the gate control signal SG of a low level VGL to disable the gate driving circuit 150 at the corresponding timing. In FIG. 3, the gate control signal SG is indicated as "VGL" at places corresponding to the frame data F3 and F6, which represents that the gate driving circuit 150 is disabled. In other words, the gate driving circuit 150 performs the normal scan driving operation to the display panel only in a timing period without the masked frame data.

In the embodiment of FIG. 3, the display driving apparatus 100 implements the power saving operation by masking a part of the frame data in the video image data SD, though the invention is not limited thereto. In other embodiment, the image detection circuit 130 can also directly disable the receiver circuit 112 in the signal transmission interface 110, such that the receiver circuit 112 does not receive the frame data, so as to achieve an effect similar to the frame data masking effect.

Figure 4:
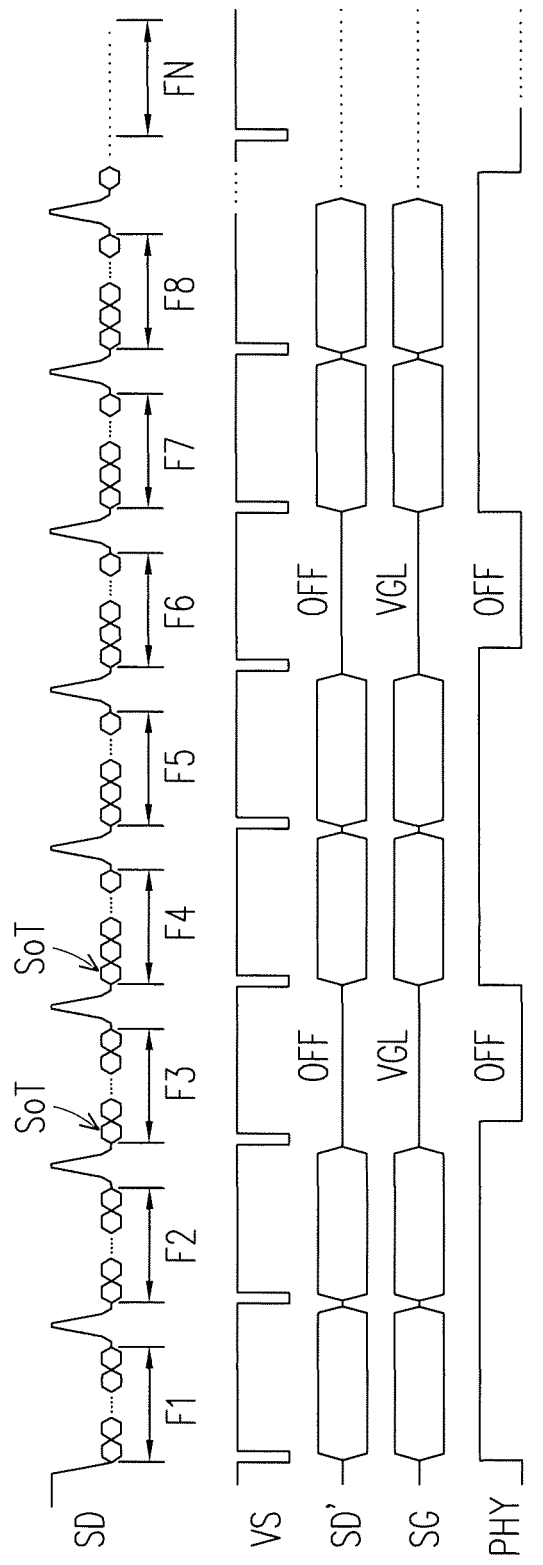
FIG. 4 is a waveform diagram of various signals of a display driving apparatus according to another embodiment of the invention.

FIG. 4 is a waveform diagram of various signals of a display driving apparatus according to another embodiment of the invention. Referring to FIG. 1 and FIG. 4, the signal waveforms of the video image data SD, the vertical synchronous signal VS, the video image data SD' and the gate control signal SG in FIG. 4 are similar as that drawn in FIG. 3, though a signal waveform of a control signal PHY used for controlling a working state of the receiver circuit 112 is further disclosed in FIG. 4.

In detail, in the present embodiment, the video image data SD includes a plurality of start signals SoT. The start signals SoT are located between the frame data F1-FN for identifying the frame data F1-FN. When the signal transmission interface 110 receives the start signal SoT, it represents that the frame data after the received start signal SoT is different to the other frame data before the received start signal SoT. Namely, the two batches of frame data before and after the start signal SoT represent frame data of different frame periods.

Therefore, in the power saving mode, the image detection circuit 130 disables the receiver circuit 112 according to the start signal SoT. For example, according to the determination result, if the timing control circuit 120 is set to be not to output the frame data F3 during the frame period of the frame data F3, when the image detection circuit 130 receives the start signal SoT located before the frame data F3, the image detection circuit 130 directly disables the receiver circuit 112 (indicated as "OFF" in FIG. 4) by using the low level control signal PHY, such that the receiver circuit 112 does not receive the frame data F3. Until the image detection circuit 130 receives the start signal SoT located after the frame data F3, the image detection circuit 130 re-enables the receiver circuit 112. In view of the video image data SD', since the receiver circuit 112 does not receive the frame data F3, the timing control circuit 120 and the source driving circuit 140 do not receive the frame data F3 either. Therefore, by directly disabling the receiver circuit 112, the effect of masking the frame data F3 in the video image data SD' is also achieved. Moreover, the method of masking the frame data F6 or other frame data by disabling the receiver circuit 112 can be deduced according to the aforementioned instructions.

In the embodiments of FIG. 3 and FIG. 4, the display driving apparatus 100 implements the power saving operation by masking a part of the frame data in the video image data SD or directly disabling the receiver circuit 112, though the invention is not limited thereto. In other embodiment, the image detection circuit 130 can also mask a part of the line data in each batch of the frame data to achieve the power saving effect.

Figure 5:
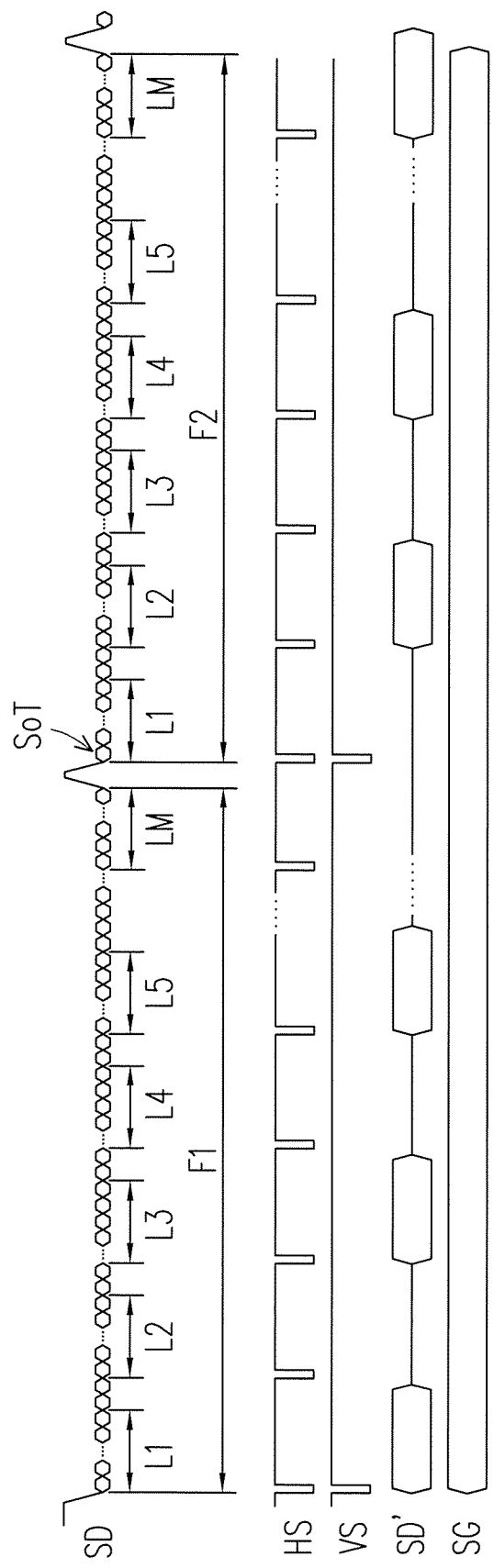
FIG. 5 is a waveform diagram of various signals of a display driving apparatus according to another embodiment of the invention.

FIG. 5 is a waveform diagram of various signals of a display driving apparatus according to another embodiment of the invention. Referring to FIG. 1 and FIG. 5, the signal waveforms of FIG. 5 are sequentially signal waveforms of the video image data SD, the horizontal synchronous signal HS, the vertical synchronous signal VS, video image data SD' output to the source driving circuit 140 and the gate control signal SG output to the gate driving circuit 150 from top to bottom.

In the present embodiment, each batch of frame data includes a plurality of batches of line data. In the power saving mode, the image detection circuit 130 masks a part of the line data in each batch of frame data to decrease the digital current consumption. In such example, the masked line data is arranged at intervals in each batch of the frame data in a fixed timing length in response to the horizontal synchronous signal HS, where the timing length, for example, refers to a timing length of one batch of line data. Taking the frame data F1 and F2 as an example, the frame data F1 and F2 respectively includes line data L1-LM. In the frame data F1, the image detection circuit 130 masks the even-numbered line data L2, L4, . . . , LM, and in the line data L2, L4, . . . , LM, a space between any batch of the line data and a next batch of the line data is a timing length of one line data. Similarly, in the frame data F2, the image detection circuit 130 masks the odd-numbered line data L1, L3, L5, . . . , LM−1 (not shown), and in the line data L1, L3, L5, . . . , LM−1, a space between any batch of the line data and a next batch of the line data is also a timing length of one line data. Therefore, the frame data F3-FN can be deduced according to the above masking manner, and timing positions and the arrangement method of the masked line data are not repeated.

In overall, in the present embodiment, in a plurality of batches of first frame data F1, F3, F5, . . . , FN−1 of the frame data F1-FN, the masked line data includes even-numbered line data L2, L4, . . . , LM in the line data L1-LM. In a plurality of batches of second frame data F2, F4, . . . , FN of the frame data F1-FN, the masked line data includes odd-numbered line data in the line data L1-LM, where the first frame data F1, F3, F5, . . . , FN−1 and the second frame data F2, F4, . . . , FN are arranged at intervals in timing.

It should be noticed that in the present embodiment, the timing position and the arrangement method of the masked line data are only used as an example, and the invention is not limited thereto. Moreover, it should be noticed that in the power saving mode, during the period that a part of the line data is masked, the gate driving circuit 150 is still in the normal scan driving state, and continuously provide the scan signal to drive the display panel.

In the embodiment of FIG. 1, the display driving apparatus 100 is a RAM-less display driving apparatus, namely, the inbuilt memory such as a frame buffer, etc. is not configured therein. However, the display driving method of the invention is not limited to be applied to the RAM-less display driving apparatus, which can also be applied to the display driving apparatus containing RAM.

Figure 6:
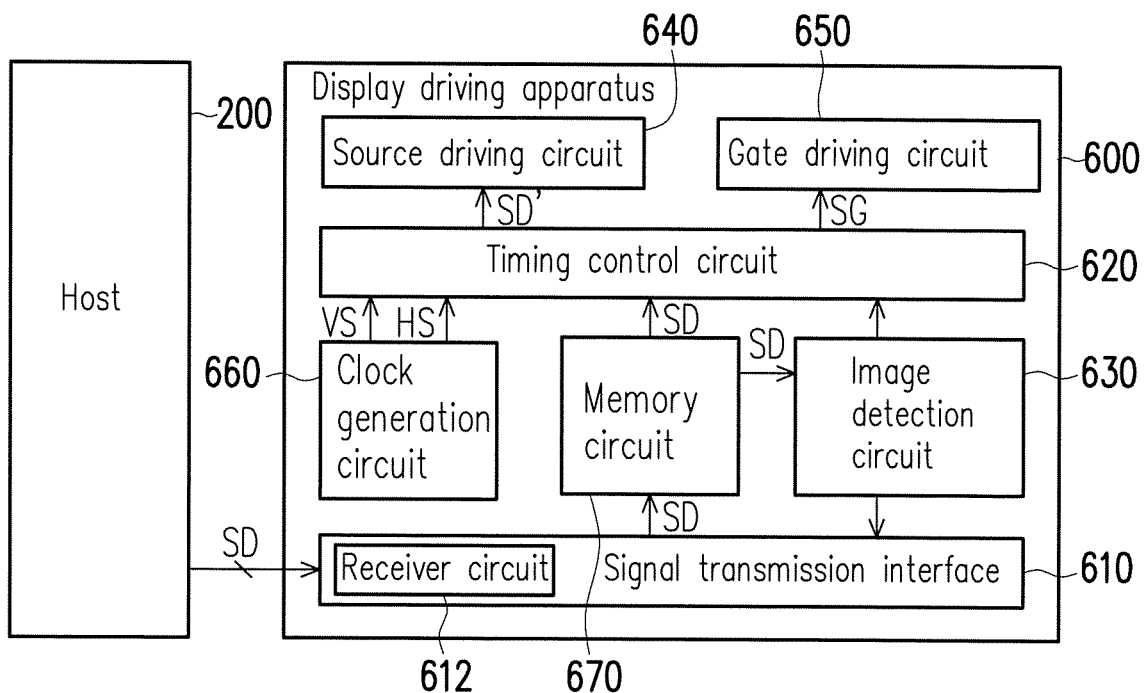
FIG. 6 is a schematic diagram of a display driving apparatus according to another embodiment of the invention.

FIG. 6 is a schematic diagram of a display driving apparatus according to another embodiment of the invention. Referring to FIG. 1 and FIG. 6, the display driving apparatus 600 of the present embodiment is similar to the display driving apparatus 100 of FIG. 1, and a main difference there between is that the display driving apparatus 600 further includes a clock generation circuit 660 and a memory circuit 670. In the present embodiment, the memory circuit 670 is used to temporarily store the video image data SD provided by the host 200, and wait for instruction of the clock generation circuit 660 to output the stored video image data SD to the clock control circuit 620. Moreover, the clock generation circuit 660 also generates the horizontal synchronous signal HS and the vertical synchronous signal VS to the timing control circuit 620 to facilitate the timing control circuit 620 driving the display panel.

Figure 7:
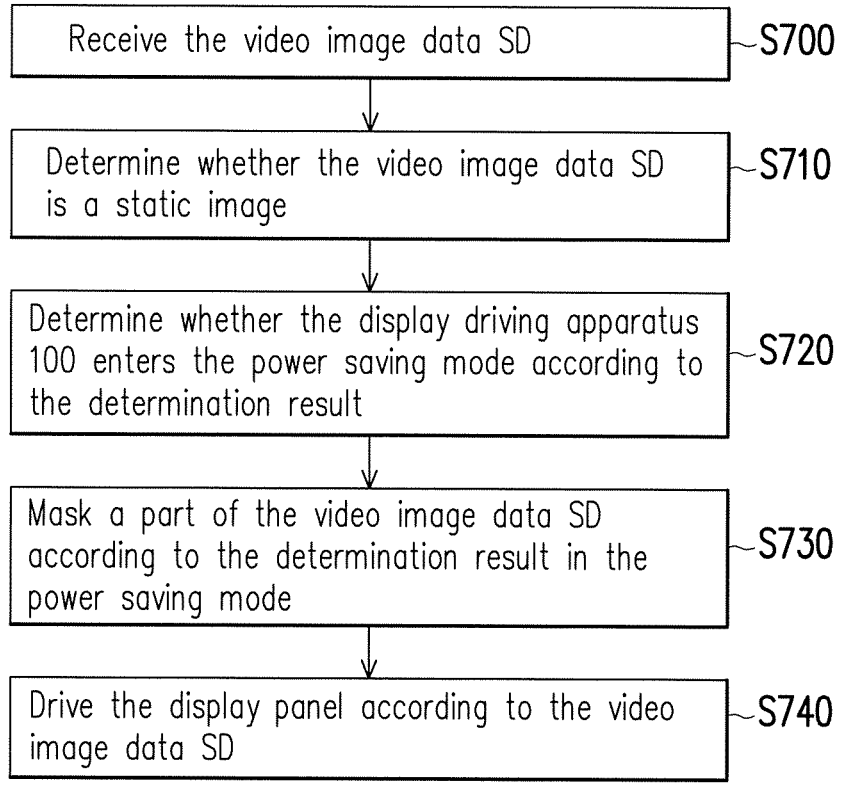
FIG. 7 is a flowchart illustrating a display driving method according to an embodiment of the invention.

FIG. 7 is a flowchart illustrating a display driving method according to an embodiment of the invention. Referring to FIG. 1 and FIG. 7, the display driving method of the present embodiment is, for example, adapted to the display driving apparatuses 100 and 600 of FIG. 1 and FIG. 6, and includes following steps.

First, in step S700, the display driving apparatus 100 receives the video image data SD. Then, in step S710, the image detection circuit 130 determines whether the video image data SD is a static image. Then, in step S720, the image detection circuit 130 determines whether the display driving apparatus 100 enters the power saving mode according to the determination result. Then, in step S730, in the power saving mode, the image detection circuit 130 masks a part of the video image data SD according to the determination result. In step S740, the display driving apparatus 100 drives the display panel according to the video image data SD.

Moreover, since enough instructions and recommendations of the display driving method of the present embodiment can be learned from the descriptions of the embodiments of FIG. 1 to FIG. 6, detailed description thereof is not repeated.

In summary, in the exemplary embodiments of the invention, the display driving apparatus has the power saving mode to decrease digital current consumption. In the power saving mode, the signal transmission interface masks a part of the video image data and does not output the masked video image data to the timing control circuit, so as to achieve a power saving effect. Moreover, the display driving apparatus can also disable the receiver circuit of the signal transmission interface to stop the receiver circuit receiving the frame data, so as to achieve an effect similar to that of masking the frame data.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display driving apparatus, adapted to drive a display panel according to video image data, the display driving apparatus comprising:
   a receiver circuit, configured to receive the video image data continuously provided by an external host at a first rate in a normal operation mode;
   a detection circuit, coupled to the receiver circuit, and configured to receive the video image data outputted by the receiver circuit, detect whether the video image data is a static image, and determine whether the display driving apparatus enters a power saving mode based on a detecting result; and
   a driving circuit, coupled to the receiver circuit, and configured to drive the display panel,
   wherein in the power saving mode, the receiver circuit continuously receives the video image data continuously provided by the external host at the first rate, and periodically masks a part of the video image data according to the detecting result and outputs an unmasked part of the video image data to the driving circuit,
   wherein the display driving apparatus is a RAM-less display driving apparatus without frame buffers.

2. The display driving apparatus as claimed in claim 1, wherein the video image data comprises a plurality of frame data, and the receiver circuit masks a part of the plurality of frame data in the video image data in the power saving mode.

3. The display driving apparatus as claimed in claim 2, wherein the video image data further comprises a plurality of start signals, and the plurality of start signals are located between the plurality of frame data for identifying the plurality of frame data.

4. The display driving apparatus as claimed in claim 3, wherein in the power saving mode, the detection circuit disables the receiver circuit according to the plurality of start signals.

5. The display driving apparatus as claimed in claim 2, further comprising a control circuit for receiving the video image data from the receiver circuit, and controlling the driving circuit based on the video image data, so that the driving circuit provides a scan signal to drive the display panel, wherein in the power saving mode, the control circuit outputs a control signal in response to the masked part of the plurality of frame data to disable the driving circuit.

6. The display driving apparatus as claimed in claim 1, wherein the video image data comprises a plurality of frame data, and each of the plurality of frame data comprises a plurality of line data, and the receiver circuit masks a part of the plurality of line data in the plurality of frame data in the power saving mode.

7. The display driving apparatus as claimed in claim 6, wherein the video image data further comprises a plurality of start signals, and the plurality of start signals are located between the plurality of frame data for identifying the plurality of frame data.

8. The display driving apparatus as claimed in claim 6, wherein the driving circuit provides a scan signal to drive the display panel during a period that the part of the plurality of line data is masked in the power saving mode.

9. A display driving method, adapted to a display driving apparatus for driving a display panel according to video image data, and the display driving method comprising:
   receiving the video image data continuously provided by an external host at a first rate in a normal operation mode;
   detecting whether the video image data received from the external host is a static image;
   determining whether the display driving apparatus enters a power saving mode based on a detecting result;
   receiving the video image data continuously provided by the external host at the first rate in the power saving mode;
   periodically masking a part of the video image data according to the detecting result in the power saving mode and outputting an unmasked part of the video image data; and
   driving the display panel according to the unmasked part of the video image data,
   wherein the display driving apparatus is a RAM-less display driving apparatus without frame buffers.

10. The display driving method as claimed in claim 9, wherein the video image data comprises a plurality of frame data, and the step of periodically masking a part of the video image data comprises masking a part of the plurality of frame data in the video image data.

11. The display driving method as claimed in claim 10, wherein the video image data further comprises a plurality of start signals, and the plurality of start signals are located between the plurality of frame data for identifying the plurality of frame data.

12. The display driving method as claimed in claim 11, wherein a receiver circuit is used to receive the video image data, and the display driving method further comprises:
disabling the receiver circuit according to the plurality of start signals in the power saving mode.

13. The display driving method as claimed in claim 10, further comprising:
providing a scan signal by a driving circuit, so as to drive the display panel; and
outputting a control signal in response to the masked part of the plurality of frame data to disable the driving circuit in the power saving mode.

14. The display driving method as claimed in claim 9, wherein the video image data comprises a plurality of frame data, each of the plurality of frame data comprises a plurality of line data, and the step of periodically masking the part of the video image data comprises masking a part of the plurality of line data in the plurality of frame data.

15. The display driving method as claimed in claim 14, wherein the video image data further comprises a plurality of start signals, and the plurality of start signals are located between the plurality of frame data for identifying the plurality of frame data.

16. The display driving method as claimed in claim 14, further comprising:
providing a scan signal to drive the display panel by a driving circuit during a period that the part of the plurality of line data is masked in the power saving mode.

* * * * *